Sept. 9, 1969  D. R. HERRIOTT ET AL  3,466,120
METHOD OF MAKING OPTICAL COMPONENTS
Filed March 14, 1966  2 Sheets-Sheet 1

INVENTORS
D. R. HERRIOTT
D. L. PERRY
J. R. WIMPERIS

BY
ATTORNEY

United States Patent Office
3,466,120
Patented Sept. 9, 1969

3,466,120
METHOD OF MAKING OPTICAL COMPONENTS
Donald R. Herriott, Morris Township, Morris County, and Darwin L. Perry and Jeffery R. Wimperis, Murray Hill, N.J., assignors to Bell Telephone Laboratories, Incorporated, New York, N.Y., a corporation of New York
Filed Mar. 14, 1966, Ser. No. 534,026
Int. Cl. G02b 1/00, 5/08
U.S. Cl. 350—320                                6 Claims

ABSTRACT OF THE DISCLOSURE

Optical components such as wave plates, filters, and the like are often of extreme thinness and fragility. Such components can be fabricated by gluing a blank to an optically neutral backing member which supports the blank during grinding and polishing and forms an integral part of the finished component.

---

This invention relates to optical components such as filters, wave plates, mirrors, and the like and to methods of making them.

The widespread interest and research in optics, most recently stimulated by the invention of the optical maser, or laser, has produced a great demand for optical components of various types. Because optical waves are electromagnetic waves, many of the components have their counterparts in the microwave art, but because the wavelengths involved are so short, it is not always possible or feasible to make some of the components through the use of conventional microwave techniques. In the case of bandpass filters utilizing reflecting surfaces separated by a dielectric, for example, it is, at least thus far, impractical to use separations in the range from 5λ to ½ millimeter, as can be done at microwave frequencies, because of the extreme thinness required for the dielectric layer. As a consequence, such filters are made in which the reflecting surfaces are separated by many hundreds or thousands of half-wavelengths. This large separation gives is, solution of the one aggravates the other, and vice rise to two problems which are mutually exclusive. That versa. These problems are moding and pass-band width. Moding is simply the presence, in the filter characteristic, of several pass bands which are separated from each other on the frequency scale. The greater the spacing between the reflecting surfaces of the filter, the closer in frequency these peaks are. Thus, for a wide spacing, several of these peaks may occur in the frequency range of interest, and the filter performance is degraded. On the other hand, as the spacing is decreased to produce a wide separation between peaks, the pass-band of the filter is broadened. In general, therefore, it is necessary to effect a compromise. It has been found that a spacing in the vicinity of approximately three hundred half-wavelengths produces a fairly sharp filter pass-band characteristic with a sufficiently wide interorder separation. Such a spacing between surfaces, however, amounts in some cases, to only a few thousandths of an inch. Heretofore, it has been virtually impossible to produce filters having such a spacing because of the requirements of optical flatness and parallelism of the reflecting surfaces.

One method of making such filters involves the cleaving of mica to achieve a thin dielectric. This method produces, at best, a filter pass-band characteristic that is approximately two to three angstroms wide, which, for many applications, is far too broad. Birefringent filters have been made with pass-band characteristics of one to two angstroms width, which also is too wide. Interference filters made with evaporated films produce characteristics of the order of 10 angstroms half-width. One type of filter that gives an extremely sharp characteristic is the Fabry-Perot interferometer, but it is of the order of a foot in length, produces moding, is very temperature sensitive, and it is difficult to build.

In the case of wave plates, the problem is even more difficult to solve. Wave plates are birefringent devices which introduce phase delays between different polarizations of light, and they are, desirably, of the order of 15 to 40 microns in thickness, depending upon the light frequencies involved. It has proven to be virtually impossible to achieve the desired degree of optical flatness and parallelism with such thin material with known techniques. Heretofore wave plates of quartz, an excellent material for this purpose, have been made by joining two quartz members with their axes crossed so that their effective length (or width) is in the 15 to 40 micron range, although their actual length is far greater. It is difficult to achieve exactly the desired effect with this method. Plastic or mica wave plates are generally unsatisfactory because of their inherent light scattering properties.

In all of the aforementioned devices, the extreme thinness required means that the material is not sturdy enough to be self-supporting, hence grinding for flatness and parallelism with present techniques is generally unsatisfactory.

The present invention is a method for making filters, wave plates and the like having the desired thinness to yield whatever results or characteristics are required.

The method of the invention, as applied to the manufacture of a bandpass filter, comprises the steps of grinding and polishing one face of a fused silica disc or plate to optical flatness, then depositing, as by evaporation, alternating layers of high and low index of refraction dielectric films, such as, for example, alternate layers of zinc sulfide or cryolite.

The coated face is then mounted on a fused silica backing plate by an optically suitable adhesive, such as, for example, epoxy cement. The other, uncoated face is then ground and polished. Intermittently, during the grinding of the second face, a temporary silver film is deposited, as by evaporation, on the face to make a temporary filter, and light of the frequency with which the filter is to be used is passed through it. From the resulting fringe pattern it is possible, by known techniques, to ascertain the wedge angle (or parallelism), flatness, and thickness of the disc. The silver is then removed as by nitric acid and the polishing and figuring continued to correct any aberrations observed. This process is continued until the desired thickness is obtained.

When the proper thickness, flatness, and parallelism is achieved, the face is then coated with alternate layers of high and low refractive index dielectric material, as was the first face. The end product is a filter having a dielectric space or layer of one to two mils up to 40 mils between the reflecting surfaces and having a filter pass band that is between one-tenth and two angstroms wide. The other filter peaks are sufficiently far removed in frequency from the principal peak that they present no problem. The filter is sturdy, insensitive to temperature, and relatively speaking, quite economical to build.

In the manufacture of a wave plate, the method of the invention is substantially the same, but the plating steps are eliminated, and a quartz crystal disc is the member that is ground and polished. One face of the crystal is ground and polished flat, then cemented with epoxy to a fused silica backing member. The other face is then ground to produce a quartz disc of the order of 40 microns thick, with flat and parallel faces.

In the method of the invention, the use of a fused silica backing plate provides the support that in turn permits grinding the filter or wave plate disc to the extremely small dimensions necessary. This backing plate, which, optically, does not affect the performance of the components made with the method of the invention is an essential element in the process of the invention. It can also be utilized in an adaptation of the method of the invention to produce curved mirrors for confocal resonators, as will be discussed hereinafter.

The principal features and objects of the invention will be readily apparent from the following description read in conjunction with the accompanying drawings, in which.

Figure 1A:
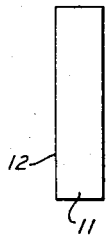
FIGS. 1A through 1F illustrate the steps of the method of the invention in making a filter.

Referring now to the drawings, there is shown in FIG. 1A a disc or blank 11 of high quality fused silica from which the dielectric spacer between the two reflecting surfaces of a filter is to be formed. To insure proper optical performance, one face 12 of disc 11 is ground and polished to a high degree of flatness.

Figure 1B:
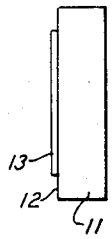

A partially transmissive, partially reflecting film 13 is deposited on face 12 by evaporation to insure a high quality optical film. Film 13, shown in FIG. 1B is composed of sufficient layers of alternate high and low refractive index dielectric films to yield a transmission from perhaps 3 percent to 17 percent at the selected wavelength.

Figure 1C:
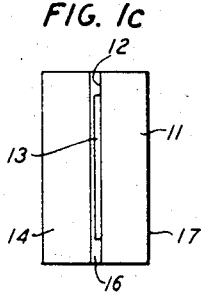
Figure 1D:
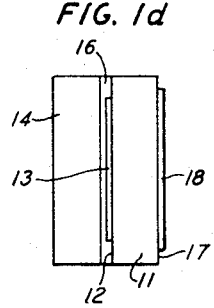

Disc 11 is then mounted on a backing plate 14 with film 13 adjacent to plate 14 by means of an optically suitable epoxy cement 16, as shown in FIG. 1C, and a second face 17 of disc 11 is then ground. It is necessary for proper operation of the filter that face 17 be ground and polished flat and parallel to face 12. It is also necessary that the final width of disc 11, which is dictated by the wavelengths of operation of the filter, be precise. To insure this precision, during the polishing of face 17, at one or more stages, face 17 is coated by evaporation with a high quality optical partially transmitting silver film 18, as shown in FIG. 1D. At this point, disc 11 and films 13 and 18 form a temporary filter which is then examined under light of the frequency for which the filter is being made. Under such illumination the temporary filter produces a fringe pattern which, as is well known in the art, indicates the flatness of face 17, the parallelism between faces 12 and 17, and the thickness of disc 11. Once the information is obtained, silver film 18 is removed by any suitable means such as, for example, nitric acid. With this information, any necessary adjustments are made in the polishing procedure to correct any observed aberrations. It is sometimes necessary to introduce the silver coating step several times during the polishing of face 17 before disc 11 is of the proper width and face 17 is flat and parallel to face 12.

Figure 1E:
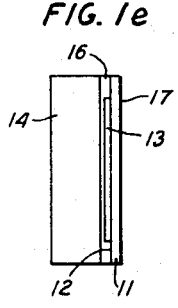
Figure 1F:
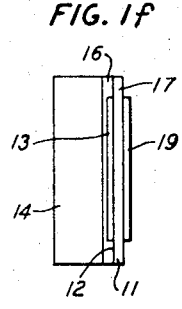

This stage of the process is depicted in FIG. 1E. After face 17 is polished, it is plated with a partially transmissive, partially reflective film 19, which, as with film 13, is composed of a suitable number of alternate layers of high and low index of refraction material. In the event that face 17 was accidentally polished too thin, the deposition of a low index of refraction film on face 17 first is usually sufficient to correct the deficiency and make the spacer an exact integral number of half-waves thick. The completed filter is shown in FIG. 1F.

It has been found that fused silica is an excellent material for the purposes of this invention. Inasmuch as it does not optically affect the performance of the filter, it is not necessary to remove backing member 14. Leaving backing member 14 attached to the filter insures a degree of ruggedness greater than that heretofore known with such filters.

Figure 2A:
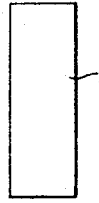
FIGS. 2A through 2E illustrate the steps of the method of the invention in making a curved protected mirror.
Figure 2B:
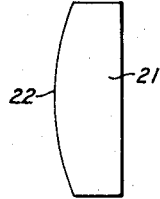
Figure 2C:
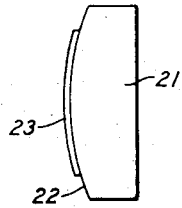
Figure 2D:
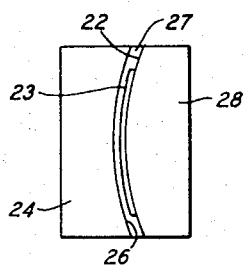

The foregoing process can be used to make protected optical mirrors also. All that is required is the use of a highly reflecting film in place of film 13, and the elimination of film 19 altogether. Where a curved protected mirror is desired, as for a confocal optical resonator, the steps as depicted in FIGS. 2A through 2E are used. Briefly, these steps are as follows:

A fused silica blank 21, as shown in FIG. 2A, has one face 22 ground and polished to produce a high quality convex surface having the desired radius of curvature, as shown in FIG. 2B. This face is then coated with a high quality highly reflecting film 23 by any suitable process as shown in FIG. 2C. The member 21 is then mounted to a fused silica backing member 24, one face 26 of which has been ground and polished to match the curvature of face 22. The assembly, shown in FIG. 2D, is held together by a layer of suitable cement 27, such as epoxy cement. The other face 28 is then ground and polished to the desired thickness. Where a high degree of accuracy is required, a temporary filter type device may be made by coating face 28 with a partially transmitting layer of silver and examining the interference pattern produced under monochromatic light as a test of thickness, curvature, and parallelism, after which the silver is removed and polishing continued until member 21 meets the requirements of thickness and parallelism, and face 28 meets the required curvature and degree of polish, as shown in FIG. 2E.

Figure 2E:
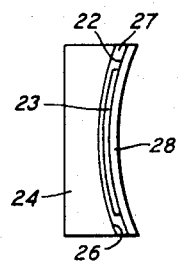

The structure of FIG. 2E may be achieved quite economically where extreme surface quality is not necessary by coating a flexible disc such as a glass or quartz microscope cover slide with a reflecting coating and suitably fastened to a suitable backing member having a concave face as was depicted in FIG. 2D.

Figure 3A:
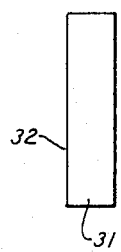
FIGS. 3A through 3D illustrate the steps of the method of the invention in making a wave plate.
Figure 3B:
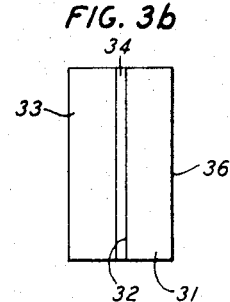
Figure 3C:
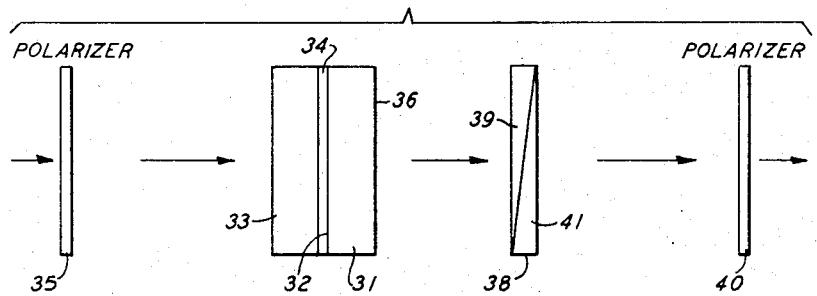
Figure 3D:
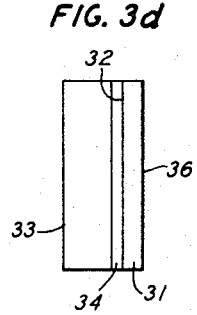

The method of the invention is basically the same as discussed heretofore for the manufacture of wave plates, but, of course, the plating steps are omitted. A Y-cut or X-cut quartz crystal blank 31 as shown in FIG. 3A, is ground and polished on one face 32 to a high degree of flatness. This face 32 is then glued to a polished fused silica backing plate 33 by means of epoxy cement 34 or other optical adhesive, as shown in FIG. 3B. A second face 36 of crystal 31 is then ground and polished until crystal 31 is the desired width and face 36 is flat and parallel to face 32. Because of the extreme precision required, the polishing of face 36 is periodically interrupted and the thickness of crystal 31 measured by means of an optical compensator, as shown in FIG. 3C. Compensator 38 comprises a pair of quartz wedges 39 and 41 and is adjustable. It in effect functions as an adjustable wave plate. Light of the frequency with which the wave plate is to be used is directed through a polarizer 35, members 33 and 31, compensator 38 and a second polarizer 40 parallel to the first. Compensator 38, which is initially adjusted to zero, that is, no effect on the light, is then adjusted by sliding members 39 and 41 until extinction of the light can be obtained at some rotation of the pair of polarizers 35 and 40. At this point the entire assembly is a half-wave plate. The amount of adjustment of member 38 required indicates the amount of material left to be polished off face 36. This step is repeated several times until extinction is achieved with the compensator set at zero, at which point crystal 31 is a half-wave plate, as shown in FIG. 3D. As an example of the precision required, face 36 must be polished flat and parallel to face 32 within one-twentieth of a wavelength. For a wavelength of 6328 angstroms, crystal 31 is only $34.9 \pm 0.1$ microns wide for a half-wave plate.

From the foregoing it can readily be seen that the method of the present invention, in which an optically neutral material is used to give support to the component during manufacture and which becomes an integral part of the complete component, enables workers skilled in the art to produce extremely accurate small devices in a relatively simple manner.

Various changes or additions to the steps of the invention may occur to workers in the art without departure from the spirit and scope of the invention.

What is claimed is:

1. A method of making passive optical components of the type including wave plates, filters, and mirrors which comprises the steps of taking a blank of material from which the component is to be made and grinding and polishing one face of the material to an optical quality surface,
permanently gluing with optical cement the one face to a backing member for supporting and strengthening the optical component, said backing member being of a material which does not interfere with the optical operation of said component,
grinding the opposite face of said blank,
periodically interrupting the grinding of said opposite face and utilizing the blank as a temporary optical component of the type in which it is being made and examining it under the influence of light of the frequency with which it is to be used to ascertain its thickness and the optical quality of said opposite face by observing the optical performance of the blank as the optical component it is intended to be, and
continuing to grind and polish said other face until it is of optical quality and the blank is of the desired thickness.

2. The method of making optical components as claimed in claim 1 wherein said backing member is of fused silica.

3. The method of making optical components as claimed in claim 2 wherein said blank is of crystalline quartz.

4. The method of making optical components as claimed in claim 2 wherein said blank is of fused silica.

5. A method of making an optical bandpass filter which comprises the steps of grinding and polishing to optical flatness one face of a blank of fused silica, applying a partially reflective, partially transmissive coating to said one face,
gluing said one face by means of an optical adhesive to a backing member of fused silica,
grinding the opposite face of said blank,
periodically interrupting the grinding of said opposite face and coating it with a reflective coating,
passing light of the frequency with which the filter is to be used through said blank and observing its transmission and filtering characteristics to ascertain the optical flatness and parallelism of said opposite face and the thickness of said blank.
removing the coating on said opposite face and continuing to grind and polish said face and periodically examine the blank as a temporary filter until the desired filter characteristic and flatness and parallelism of said opposite face are obtained, and
applying a partially reflective, partially transmissive coating to said opposite face.

6. A method of making an optical bandpass filter as claimed in claim 5 in which the coating on the first and opposite faces is made up of a plurality of alternate layers of high and low refractive index dielectric materials.

References Cited

UNITED STATES PATENTS

| 2,936,732 | 5/1960 | Ring et al. | |
| 3,039,362 | 6/1962 | Dobrowolski | 350—166 |

OTHER REFERENCES

Holmes et al., Spectrolab, "Quarterly Progress Report No. 2, Design and Fabrication of Optical Filters for Laser Frequency," May 10, 1963 to Aug. 9, 1963, Contract No. AF33(6570)-9216, May 4, 1965. Found in 350—166.

DAVID SCHONBERG, Primary Examiner

T. H. KUSMER, Assistant Examiner

U.S. Cl. X.R.

350—163, 166; 117—33.3, 35